J. A. HADLEY.
COMBINED HAY RAKE AND LOADER.
APPLICATION FILED NOV. 1, 1916.
1,230,152.
Patented June 19, 1917.
2 SHEETS—SHEET 1.
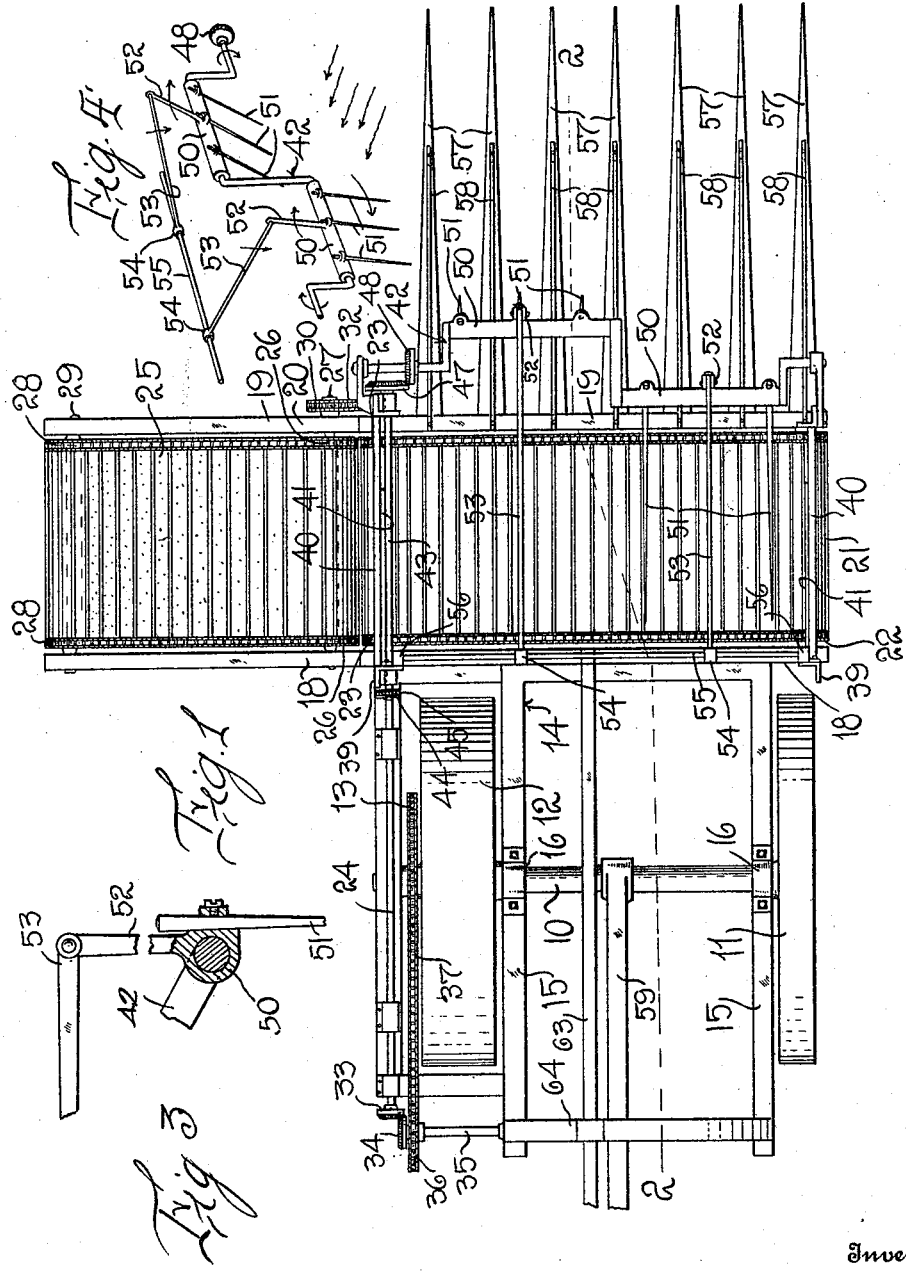
Inventor
J. A. HADLEY
By Watson E. Coleman
Attorney

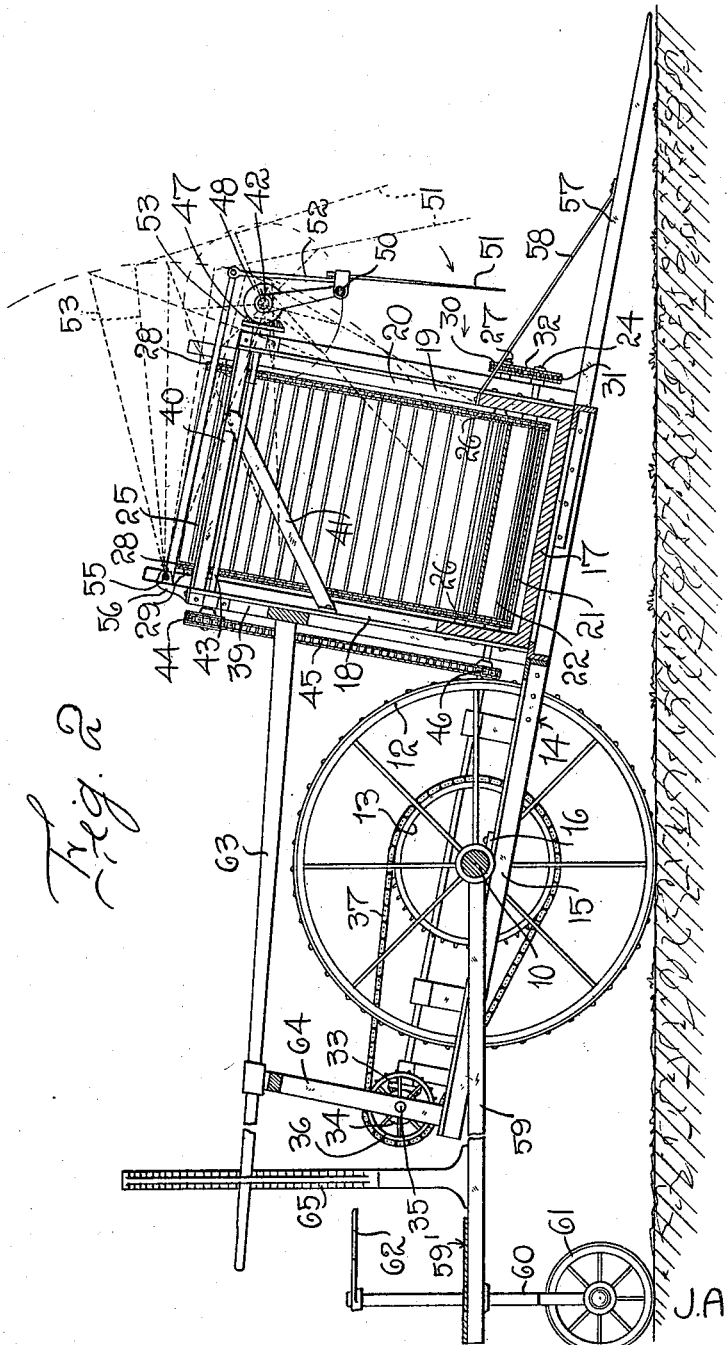
J. A. HADLEY.
COMBINED HAY RAKE AND LOADER.
APPLICATION FILED NOV. 1, 1916.
1,230,152.
Patented June 19, 1917.
2 SHEETS—SHEET 2.

UNITED STATES PATENT OFFICE.

JAMES A. HADLEY, OF SWANLAKE, IDAHO.

COMBINED HAY RAKE AND LOADER.

1,230,152.  Specification of Letters Patent.  Patented June 19, 1917.

Application filed November 1, 1916. Serial No. 128,960.

*To all whom it may concern:*

Be it known that I, JAMES A. HADLEY, a citizen of the United States, residing at Swanlake, in the county of Bannock and State of Idaho, have invented certain new and useful Improvements in Combined Hay Rakes and Loaders, of which the following is a specification, reference being had to the accompanying drawings.

This invention relates to hay harvesting devices and particularly to a combined hay rake and loading device whereby the hay after it has been mown may be raked up and loaded onto a hay rack directly without the necessity of putting the hay up in cocks and then loading it.

One object of the invention is the provision of a very simple machine of this character which is effective in use and which may be driven in the manner of a header, that is which may be pushed by horses hitched behind the machine.

A further object of the invention is to provide means whereby the inclination of the machine to the ground and, therefore, the inclination of the fingers which pass beneath the hay may be readily regulated and controlled by a single operator.

A further object is to provide effective raking devices designed to engage the hay on the fingers and draw the hay to the elevators and another object is to provide for an effective steering of the machine.

Other objects will appear in the course of the following description.

My invention is illustrated in the accompanying drawings, wherein—

Figure 1 is a plan view of a hay gathering and loading machine constructed in accordance with my invention;

Fig. 2 is a longitudinal sectional view on the line 2—2 of Fig. 1;

Fig. 3 is a fragmentary sectional view through the sleeve 50; and

Fig. 4 is a perspective view of the raker cranks and allied parts.

Referring to these drawings it will be seen that for the support of the machine I provide an axle 10 upon which is mounted the supporting wheels 11 and 12, 12 being relatively wide and delivering power for operating the machine. Mounted upon this wheel 12 is a sprocket wheel 13 from which the power is taken. Supported upon the axle 10 so that it may be rocked upon this axle as a pivot is a main frame designated generally 14 and including side bars 15 which are formed with bearings 16 embracing the axle 10. This main frame 14 may be of any suitable construction but is preferably made of angle iron and extending from this main frame 14 are the angle iron supporting members which support the platform 17 having the front and rear side walls 18 and 19. The platform 17 extends transversely across the front of the machine and then upward as at 20 and the sides 18 and 19 also extend upward, as indicated in Fig. 1. Mounted on the platform and movable longitudinally therealong is an endless elevator or carrier designated generally 21 which may be of any suitable construction but as illustrated is formed of laterally disposed sprocket chains with an intermediate web of canvas or other material. This web may be made of slats if desired. I do not wish to be limited to any particular form of conveyer or carrier. The chains of this carrier pass at their rear ends over the rollers 22 and mounted upon the sides 18 and 19 at the rear end of the platform and over sprocket wheels 23 mounted upon a shaft 24. The upwardly extending portion 20 of the platform has mounted upon it a conveyer 25 of the same character as the conveyer 21 and passing over sprocket wheels 26 mounted upon a shaft 27 and over sprocket wheels 28 mounted upon a shaft 29. The shaft 27 carries upon it a sprocket wheel 30 which is driven from a sprocket wheel 31 mounted upon the shaft 24 by means of a sprocket chain 32. Any other suitable driving means may be used if desired.

The shaft 24 is supported in suitable bearings in the frame of the machine and extends rearward and at its rear end carries a beveled gear wheel 33 which is engaged by a beveled gear wheel 34 mounted upon a shaft 35 supported in suitable bearings and carrying a sprocket wheel 36 from which a chain 37 passes over the sprocket wheel 13 attached to the traction wheel 12. Thus power is delivered to the belt operating mechanism.

Extending upward from the rear side wall of the platform are the supporting standards 39 and extending forward from these supporting standards are angle irons 40 supported by braces 41 and mounted in suitable bearings upon the angle irons 40 is the crank shaft 42. This shaft has two crank portions. The shaft is driven by means of a shaft 43 which extends longitudinally of the machine and carries on its rear end a sprocket wheel 44 driven by means of a sprocket chain 45 from a sprocket wheel 46 mounted upon the shaft 24. This shaft 43 carries a beveled gear wheel 47 meshing with a beveled gear wheel 48 mounted upon the crank shaft 42.

Mounted upon each of the cranked portions of the shaft 42 is a sleeve 50 and mounted upon this sleeve are a plurality of rake teeth 51. These teeth may be mounted upon the sleeve 50 in any suitable manner and there may be any number of these teeth. Preferably the teeth are adjustable with relation to the sleeve so that they may be lengthened or shortened. Attached to the sleeve 50 is a rearwardly directed arm 52 and pivotally connected to this arm is a link 53 which extends rearward and is pivotally connected to a suitable bracket 54 mounted upon a transversely extending supporting bar 55 in brackets which in turn are mounted upon the standards 39, these standards being braced by braces which extend down to the main frame of the machine. The object of this pitman 53 is to cause the rakes, as the crank shaft revolves to take the proper position for raking up the hay onto the elevator, as illustrated in Fig. 2.

For the purpose of gathering the hay or lifting it into position where it may be operated upon by the rakes and drawn upon the elevator, I provide a plurality of forwardly extending elongated fingers 57 which are attached beneath the platform and project out in front thereof and are formed at their forward ends so as to guide easily over the ground and from these teeth extend the guide rods 58 which extend upward and rearward to the upper edge of the vertical wall 19. These members 58 act to brace the fingers 57 and also to guide the hay upward into position to be operated upon by the rake teeth 51.

Swingingly mounted upon the axle 10 is a rearwardly extending beam 59 and disposed through the rear end of this beam is the vertical shaft 60 carrying a steering wheel 61 which engages the ground and at its upper end carries the steering rudder 62.

The operator upon the platform 59 can thus steer the machine properly in accordance with the contour of the ground.

For the purpose of permitting the operator to raise or lower the fingers 57, that is oscillate the frame 14 so as to raise or lower the fingers 57, I mount rigidly upon the frame 14 the rearwardly extending lever 63. This may be connected in any manner to the standards 39 and at its rear end is rigidly connected by means of the member 64 to the rear end of the frame 14. This lever 63 extends rearward into a position adjacent the steering rudder 62 and is adapted to operate over a vertical rack 65 mounted upon the beam 59. It is obvious, therefore, that by depressing the lever 63 and engaging it with the proper tooth on the rack, the forward end of the machine will be raised while by raising the lever, the forward end of the machine will be depressed. It will be seen that this result is accomplished by pivotally supporting the frame 14 upon the axle so that the axle acts as a fulcrum for the frame.

The operation of this machine is obvious from what has gone before. The machine is pushed along the field by means of any suitable power and as it is so pushed the fingers 57 pass beneath the hay on the field and the hay passes up the fingers and the guides 58. As it does so it is caught by the oscillating rakes and drawn onto the elevator, the elevator carrying the hay laterally and upward and discharging it into a wagon. It is obvious that by depressing the lever 63 the forward end of the machine including the fingers may be raised so that the points of the fingers will escape the ground and merely pass beneath the hay which is ordinarily supported on the stubble. Only one operator is required and he can at any moment change the height of the fingers 57 from the ground to conform to the contour thereof by shifting the lever 63. At the same time he can steer the machine by the rudder extending from the steering post.

While I have illustrated a particular arrangement of gears whereby the carrier and the crank shaft carrying the rakes may be driven, I wish it understood that this arrangement may be modified in many ways without departing from the spirit of the invention.

Having described my invention, what I claim is:

A rake and elevator comprising a wheeled supporting frame, a transversely extending carrier mounted at the forward end of the frame and extending upward at one end, gathering fingers supported in front of the carrier, a cranked shaft operatively supported upon the frame of the machine and having a plurality of cranked portions extending transversely across the gathering fingers at the rear end thereof and adjacent the carrier, a sleeve rotatably mounted on each cranked portion of the shaft and each sleeve having an upward extension, rake teeth adjustably mounted in said sleeves, links operatively connected to each upward extension and pivotally supported at their rear ends, means for raising or lowering the forward end of the frame, and means for operating the carrier and the crank shaft.

In testimony whereof I hereunto affix my signature in the presence of two witnesses.

JAMES A. HADLEY.

Witnesses:
W. F. FISHER,
VICTOR R. FISHER.